United States Patent [19]

Jaksic

[11] Patent Number: 4,762,017
[45] Date of Patent: Aug. 9, 1988

[54] SELF-ADJUSTING CABLE CONTROL DEVICE

[75] Inventor: Miroslav Jaksic, Ann Arbor, Mich.

[73] Assignee: Acco Babcock Inc., Fairfield, Conn.

[21] Appl. No.: 131,274

[22] Filed: Dec. 9, 1987

Related U.S. Application Data

[63] Continuation of Ser. No. 917,914, Oct. 10, 1986, abandoned.

[51] Int. Cl.$^4$ .................. F16C 1/10; F16D 11/00; F16D 13/60; F16D 65/38
[52] U.S. Cl. .................. 74/501 R; 192/111 A; 192/70.25; 188/196 B; 188/196 P
[58] Field of Search .......... 74/501 R, 501 A, 501 D, 74/501 E, 501 F, 502, 503; 192/111 A, 70.25, 30 W; 188/196 B, 196 P, 196 V

[56] References Cited

U.S. PATENT DOCUMENTS

| | | | |
|---|---|---|---|
| 2,884,097 | 4/1959 | Stultz et al. | 74/501.5 R |
| 2,957,354 | 10/1960 | Morrow | 74/501.5 R |
| 3,572,159 | 3/1971 | Tschanz | 74/501.5 R |
| 4,177,691 | 12/1979 | Fillmore | 74/501.5 R |
| 4,464,950 | 8/1984 | Deligny | 74/501.5 R |
| 4,598,809 | 7/1986 | Glover et al. | 74/501.5 R |

FOREIGN PATENT DOCUMENTS

| | | | |
|---|---|---|---|
| 0120616 | 10/1984 | European Pat. Off. | 74/501.5 R |
| 3305417 | 6/1984 | Fed. Rep. of Germany | 74/501.5 R |
| 57-80959 | 5/1982 | Japan | 74/501.5 R |
| 8300225 | 3/1984 | PCT Int'l Appl. | 74/501.5 R |
| 2088502 | 6/1982 | United Kingdom | 74/501.5 R |
| 2157789 | 10/1985 | United Kingdom | 74/501.5 R |

Primary Examiner—Gary L. Smith
Assistant Examiner—Vinh Luong
Attorney, Agent, or Firm—Barnes, Kisselle, Raisch, Choate, Whittemore & Hulbert

[57] ABSTRACT

A self-adjusting cable control device for automatically compensating for wear in a control cable system. The device includes a termination member connected at one end of a control cable and a connecting member attached to an actuation member. The connecting member carries a clutch for locking with the termination member upon application of force to the actuation member. A spring is provided to move the cable with respect to the actuation member when the clutch is disengaged from the termination member. The clutch comprises a plurality of collet members which are hinged to the connecting member and are movable radially toward and away from and surround the termination member. The collet members have conical surfaces at one end adapted to engage complementary conical surfaces on the connecting member and serrations which engage complementary serrations on the termination member. The control device further includes a release tube that is accessible from the exterior of the device and can be engaged and moved axially inwardly to disengage the collet members and thereby permit easy connection of the device to the cables.

9 Claims, 2 Drawing Sheets

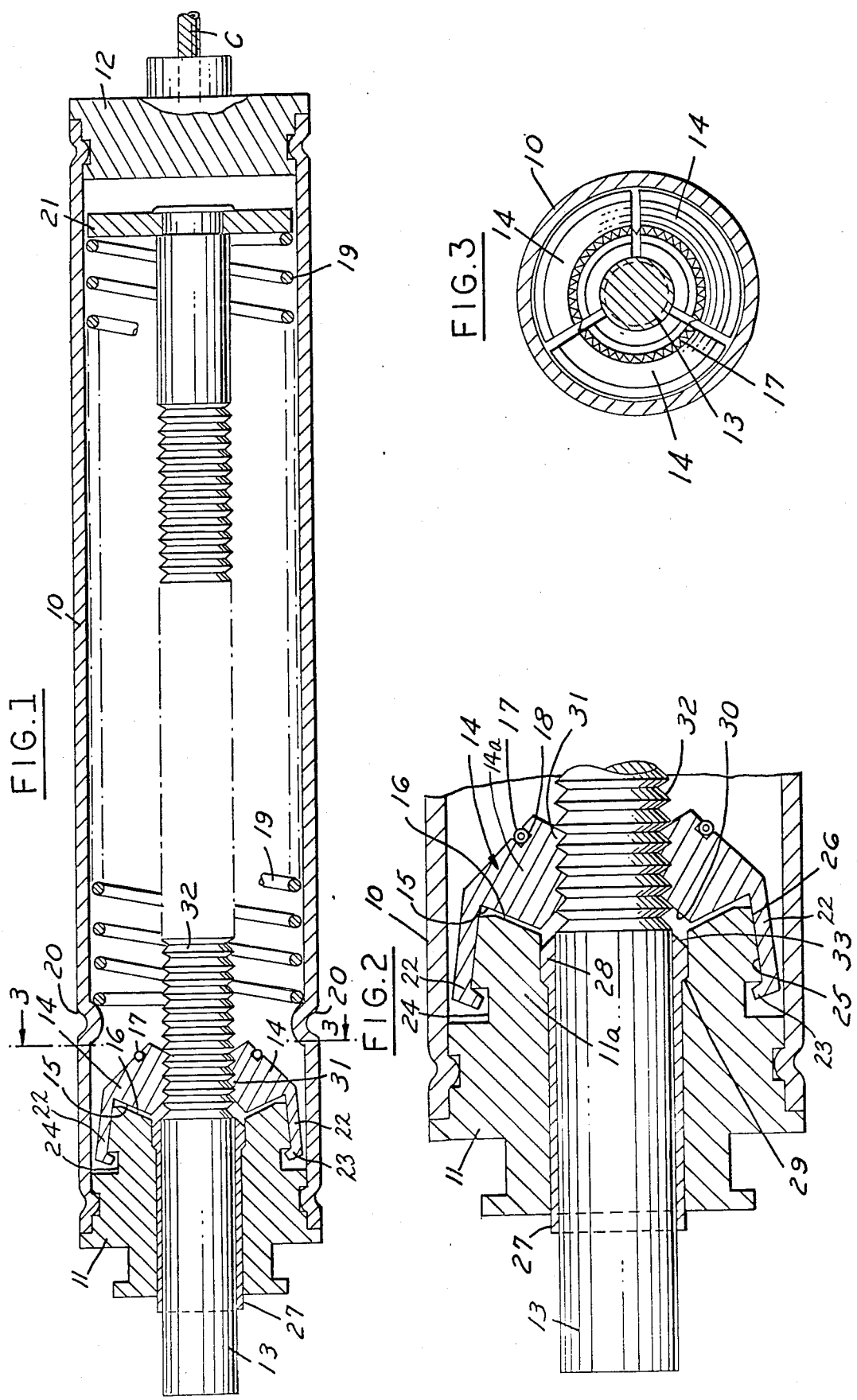

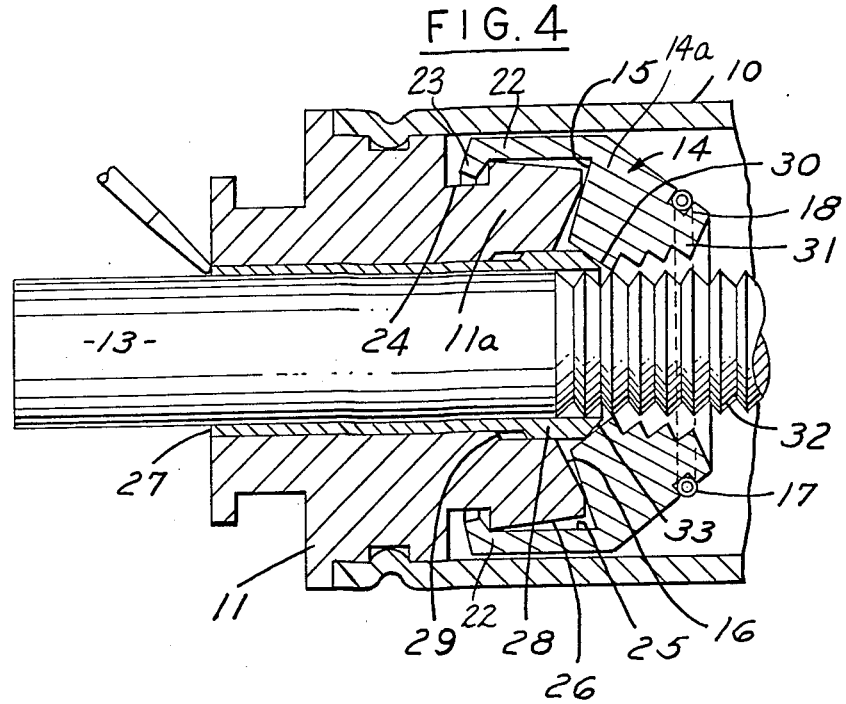

SELF-ADJUSTING CABLE CONTROL DEVICE

This application is a continuation of application Ser. No. 917,914, filed Oct. 10, 1986, now abandoned.

The invention relates to a self-adjusting cable control device which will automatically compensate for wear in a control cable system to insure that proper tension and tolerances are maintained in the system.

BACKGROUND AND SUMMARY OF THE INVENTION

Cable operated controls are utilized in a number of control systems. For example, a clutch mechanism in a manual shift automobile is often connected by means of a flexible control cable to a clutch pedal mounted on the fire wall separating the engine compartment from the passenger compartment. In addition, flexible control cables are often utilized in brake systems where a brake is connected by means of a flexible control cable to a brake pedal also mounted on a fire wall.

The control cables in such systems often require adjustment in order to accommodate manufacturing tolerances in the cable itself or in the controlled member operated by the cable. Further adjustment may be required after a period of use to accommodate wear in the cable and attachments including sheaves or in the member controlled by the cable.

For example, in a manual shift system, the clutch mechanism facing plate wears during use resulting in the relatively heavy clutch spring drawing the control cable further towards the clutch mechanism and effectively shortening the cable whereby play will be introduced between the clutch pedal and the control cable. In brake systems, the opposite result occurs, that is, the effective length of the cable is lengthened as a result of the cables and attaching brackets taking a permanent deflection after a load is applied, again resulting in undesirable slack in the cables.

Such cable control systems can be adjusted manually to achieve the desired regulation but this usually requires shutting down of the system (in the case of an automobile, taking it to a garage) and obtaining the services of a mechanic.

Various structures have been proposed in the past to provide for a self-adjusting feature to assure proper tensioning of a control cable in a control system. Such devices have, however, been expensive to manufacture and often took up an undue amount of space in the engine compartment is limited and it is often difficult to provide space between the fire wall and a member to be controlled in which to position any self-adjusting control device.

In U.S. Pat. No. 4,378,713, there is disclosed and claimed a self-adjusting control cable device including a termination member which is adapted to be connected to the end of a cable extending to a controlled member such as a manual gear shift clutch mechanism or brake. The device also includes a connecting member adapted to connect with a flexible cable or rod leading to an actuation member such as a brake or clutch pedal. A main housing surrounds the termination and connecting members. A first spring is included for urging the termination member towards the connecting member and a second spring is included for urging the connecting member towards the termination member. A clutch means is carried by the connecting member and is adapted to engage and lock with the termination member when the connecting member is moved against the force of the second spring means by the actuation member. Engagement and locking of the clutch with the termination member will then pull the control cable to actuate the controlled member. When force is released from the actuation member, the second spring will move the connecting means and clutch means towards the termination member allowing the clutch means to disengage from the termination member. The termination member and control cable are then free to move with respect to the connecting means to accommodate for any wear in the system. Thus, in a brake system, the termination end will be urged to move towards the connecting member by the force of the first spring to take up any slack in the control cable. In the case of a clutch mechanism in a manual gear shift system, the termination end will be free to move away from the connecting member under the force of the heavy clutch spring of the clutch mechanism.

The main housing may be anchored to a wall, such as a fire wall separating the engine and operator compartments of a vehicle, or the device may be anchored between cable conduits extending between the controlled member and the fire wall.

In one form shown in U.S. Pat. No. 4,378,713, the clutch means comprises an annular collar which fits loosely around the termination member and which has an ear fitting into a slot in the connecting member. As the connecting member is moved away from the termination member, the annular collar will tilt such that its inside periphery will engage and lock with the termination member. Both the inside periphery of the annular collar and outside surface of the termination member may have serrated surfaces to better insure a locking engagement between the two parts.

In another form shown in U.S. Pat. No. 4,378,713, the connecting member comprises a circular housing and the clutch means comprises at least one radially movable collet piece carried by the connecting member. The connecting member has a tapered surface adapted to engage the collet piece and move it radially inwardly of the termination piece when the connecting member is moved away from the termination member by a force being applied to an actuation member. A third spring means is operatively positioned between the collet piece and the circular housing to urge the collet piece to a locked position with respect to the termination member. A stop is provided in the main housing to limit movement of the circular housing towards the termination member under the force of the second spring means and to also limit movement of the collet piece.

When the self-adjusting take up feature is utilized in connection with parking brake systems, the requirements become more stringent.

Federal Department of Transportation requires that all automobiles have a mechanical parking brake system capable of holding the vehicle on a 30% grade. Parking brake systems generally use a ratchet lock, hand or foot lever to apply a tension load to the rear brake shoes or pads. This load is usually transmitted by strand in a flexible conduit.

Proper adjustment at assembly line level has always been a problem for automotive manufacturers. Devices to impose a heavy load at time of initial adjustment are commonly used. The system will get out of adjustment if: the strand takes a permanent set from extension under load—the conduits shorten because of compression set—the swaged terminations slip on the strand—or the conduits seat in their respective anchorages.

Transporting the cars on carriers with the brake system under heavy loads and use by the owner after delivery may cause the system to get out of adjustment with high warranty cost to the manufacturer for manual adjustment by the dealer.

In U.S. application Ser. No. 832,526 filed Feb. 21, 1986 having a common assignee as the present application, a self-adjusting cable control device for automatically compensating for wear in a control cable system is disclosed and includes a termination member connected at one end of a control cable and a connecting member attached to an actuation member. The connecting member carries a clutch for locking with the termination member upon application of force to the actuation member. Spring means are provided to move the cable with respect to the actuation member when the clutch is disengaged from the termination member. The clutch comprises a plurality of collet members which are movable radially and longitudinally and surrounds the termination member. The collet members have conical surfaces at each end adapted to engage complementary conical surfaces on the connecting member and serrations which engage complementary serrations on the collet members. The control device further includes a release tube that is accessible from the exterior of the device and can be engaged and moved axially inwardly by a clip to disengage the collet members and thereby permit easy connection of the device to the cables. In addition, provision is made for a separate clip normally holding the tube in a position and operable to release the release tube and the collet members to operative position.

In accordance with the invention, the collet members are hinged to the termination member and are movable radially toward and away from the connecting member. Accordingly, less longitudinal movement is required between the termination member and connecting member permitting a more accurate adjustment.

It is an objective of the present invention to provide an improved control device to automatically impose a predetermined tension load at assembly line level. This loading is accomplished by the stored energy in the integral compression spring. Also of great importance is the continuing self-adjusting feature that compensates for stretch of strand-compressive set of conduits-slippage of terminations and seating of all of the system components. This provides for a long life properly adjusted parking brake system without any manual maintenance.

Among the further objectives of the invention are to provide a self-adjusting cable control device for automatic brake adjustment which is lower in cost, requires lower tooling cost, has improved ability for application to a wide range of vehicles that require special packaging considerations in the vehicle interior, is easily and safely installed in the vehicle assembly plant, and is easy to service in the field due to the ease of accessibility.

Further objectives are to provide such a self-adjusting cable control device which includes a quick release feature that facilitates installation, servicing and replacement, which can be safely locked for shipment to the vehicle assembly plant, which is shorter in length and width permitting installation in vehicles with little available space and reducing the overall mass subjected to vibration and resultant noise from contact with adjoining vehicle services.

DESCRIPTION OF THE DRAWINGS

FIG. 1 is a longitudinal sectional view of a self-adjusting cable control device embodying the invention.

FIG. 2 is a fragmentary sectional view of an enlarged portion of the device showing the device in a different operative position.

FIG. 3 is a sectional view taken along the line 3—3 in FIG. 1.

FIG. 4 is a sectional view similar to FIG. 3 showing the parts in a different operative position.

DESCRIPTION

Referring to FIGS. 1-3, the self-adjusting cable control device embodying the invention is adapted to be interposed between brake cables not shown. The device comprises a connecting member in the form of a tubular housing 10 having its ends closed by members 11, 12. Connecting member 10 is adapted to be connected as by a cable C to an activating member such as a clutch or brake. Portions of housing 10 are crimped into grooves on members 11, 12 to hold the members 11, 12 in position. A termination member 13 in the form of a rod extends through an opening in the end member 11 and is connected to one cable in any suitable manner such as a conventional attaching clip.

A clutch is provided and includes collet members 14 positioned about the termination member 13 within the inwardly extending tubular portion 11a of member 11. The collet members 14 have external conical surfaces 15 at one end adapted to engage a complementary internal conical surface 16 on a projection 11a on the end member 11. A circular retaining spring 17 extends circumferentially in aligned grooves 18 in each collet member 14 to yieldingly urge the collet members 14 toward the termination member 13. A helical spring 19 is interposed between an abutment or shoulder 20 formed by a groove on the connecting member 12 and a washer 21 fixed on the end of the termination member 13 and yieldingly urging the termination member 13 in a first direction A inwardly of the housing 10 and to the right as seen in FIG. 1. The angle which the surfaces 15 on the collet 14 members 14 make with the axis of the housing 11 is slightly greater than the angle which the conical surface 16 makes with the axis of housing 11.

Each collet member 14 further includes a body portion 14a and a hinge arm 22 that extends generally longitudinally in a second direction and has a radial tab at the free end of the hinge arm 23 spacer or engaging an annular groove 24 on the periphery projection 11a of the end member 11 thereby hinging each collet member 14 on the projection 11a. Each arm 22 includes an inner surface 25 which engages a complementary surface 26 on the projection 11a extending at an acute angle to the longitudinal axis of the connecting member 10 and termination member 13.

The device further includes a release tube 27 that extends through the end member 11 and surrounds the termination member 13. The release tube 27 includes an enlarged inner end 28 that engages a shoulder 29 on the end member 11 retaining the tube 26 against axially outward movement. The release tube 26 is operated by a tool or by engagement with a clip to urge the collets 14 to the right as viewed in FIG. 1 thereby disengaging the collets 14 and permitting disassembly or adjustment of the device. The end of each collet 14 nearest the release tube 26 is formed with a frustoconical surface 30 that extends radially and axially inwardly from the end nearest the tube 26. Serrations 31, 32 on the collet members 14 and termination member 13 are preferably annular and symmetrical in the form of teeth which have a triangular cross section preferably with an included angle of ninety degrees (90°). The surfaces 30 are engaged by a complementary frustoconical surface 33 on the enlarged end 28 of the release tube 26 to force the collets 14 to swing radially outwardly and cause the serrations 31 on the collets to disengage from the serrations 32 on the termination member 13.

When an adjustment needs to occur because of slack, the spring 19 urges the termination member 13 to the right so that the force acting on teeth 31 resulting from teeth 32 on termination member 13, forces the collet members 14 to moving radially outwardly disengaging the teeth 31, 32 until the slack is removed and the teeth re-engage.

A clip may be provided to lock termination member 13 in the full out position (to the left in FIG. 1) to allow connection of the separate cables during assembly as disclosed in the aforementioned United States application. Disengagement of the clip releases the tube 26 to allow removal of slack in the cables after the mechanism is in position on the vehicle.

It can thus be seen that the resultant self-adjusting cable control device is less complex, utilizes a lesser number of parts, lower in cost, requires lower tooling cost, has improved ability for application to a wide range of vehicles that require special packaging considerations in the vehicle interior, is easily and safely installed in the vehicle assembly plant, and is easy to service in the field due to the ease of accessibility.

I claim:

1. A self-adjusting automatically compensating cable control device in a control device system comprising
a termination member adapted to be connected at one end of a control cable and having longitudinally spaced serrations on the exterior thereof,
a connecting member adapted to be attached to an actuation member,
a plurality of collet members having a body portion and a hinge arm, said body portion having longitudinally spaced serrations thereon normally engaging the serrations on said termination member,
spring means interposed between said termination member and said connecting member for moving the termination member longitudinally relative to the connecting member in a first longitudinal direction when the collet members are disengaged from the termination member,
said hinge arm of each said collet member extending generally longitudinally from the body of the collet member in a second longitudinal direction opposite to said first longitudinal direction in which the termination member is moved by said spring means,
each said hinge arm having a free end,
means for hinging said hinge arms of said collet member to said connecting member at the free ends of said hinge arms of said collet members such that the body portions of said collet members are able to move radially inwardly and outwardly generally perpendicular to move the serrations thereon toward and away from said serrations on said termination member,
said connecting member having a fixed internal conical surface at one end of said connecting member,
said collet members having external conical surfaces intermediate the free ends and the serrations thereon,
said conical surfaces normally engaging said conical surface on the connecting member, and when the force on the termination member is reduced below a predetermined level, the spring means acting on the termination member causes body portions of said collet members to swing about the connecting member to move the body portions of said collect members radially outwardly about the ends of the hinge arms to disengage the serrations on the collet members from the serrations on the termination member and the spring means acting on said termination member moves the termination member relative to said connecting member until the force on the termination member reaches the predetermined value whereupon the collet members re-engage the serrations on the termination member.

2. The self-adjusting cable control device set forth in claim 1 wherein each said hinge arm extends generally longitudinally outwardly, said connecting member having an axially inwardly extending portion, said portion having an annular groove therein, each said arm having a tab at the free end thereof extending into said groove.

3. The self-adjusting cable control device set forth in claim 1, wherein said connecting member comprises a tubular housing having end members fixed to said tubular housing, one of said end members having an inwardly axially extending portion spaced from said tubular housing, said hinge arms of said collet members extending into the space between the tubular housing and the axially extending portion surrounding the collet members.

4. The self-adjusting cable control device set forth in claim 1 including a light spring surrounding said collet members and yieldingly urging said collet members radially inwardly toward said termination member, said spring being positioned in circumferentially aligned grooves on said collet members, said grooves being positioned at the end of said collet members remote from said hinge arms which have said serrations thereon and adjacent said conical surfaces on said collet members.

5. The self-adjusting cable control device set forth in claim 4, wherein said conical surface of each said collet member forms a slightly greater angle with the axis of the termination member than the conical surface on the connecting member.

6. The self-adjusting cable control device set forth in claim 1 including a release tube on said connecting member and surrounding said termination member, said release tube being accessible from the exterior of said connecting member and operable when moved axially inwardly to engage the body portions of the collet members and disengage the collet members from the termination member to release the serrations on said collet members from engagement with said serrations on said termination member.

7. The control device set forth in claim 6 wherein said release tube includes an enlarged end which engages said collet members.

8. The control device set forth in claim 7 wherein each of said collet members includes a frustoconical surface which extends radially and axially inwardly and is adapted to be engaged by said enlarged end of said release tube when said tube is moved axially inwardly.

9. A self-adjusting automatically compensating cable control device in a control cable system comprising a termination member adapted to be connected at one end of a control cable and having longitudinally spaced serrations on the exterior thereof, a connecting member adapted to be attached to an actuation member, a plurality of collet members having a body portion and a hinge arm, said body portion having longitudinally spaced serrations thereon normally engaging the serrations on said termination member, spring means interposed between said termination member and said connecting member for moving the termination member longitudinally relative to the connecting member in a first longitudinal direction when the collet members are disengaged from the termination member, said hinge arm of each said collet member extending generally longitudinally from the body of the collet member in a second longitudinal direction opposite to said first longitudinal direction in which the termination member is moved by said spring means, each said hinge arm having a free end, means for hinging said hinge arms of said collet members to said connecting member at the free ends of said hinge arms of said collet members such that the body portions of said collet members are able to move radially inwardly and outwardly generally perpendicular to move the serrations thereon toward and away from said serrations on said termination member, said connecting member having a conical surface, said collet members having conical surfaces normally engaging said conical surface on the connecting member, and when the force on the termination member is reduced below a predetermined level, the spring means acting on the termination member causes body portions of said collet members to swing about the connecting member to move the body portions of said collet members radially outwardly about the ends of the hinge arms to disengage the serrations on the collet members from the serrations on the termination member and the spring means acting on said termination member moves the termination member relative to said connecting member until the force on the termination member reaches the predetermined value whereupon the collet members re-engage the serrations on the termination member, each said hinge arm extending generally longitudinally outwardly, said connecting member having an axially inwardly extending portion, said portion having an annular groove therein, each said arm having a tab at the free end thereof extending into said groove, said connecting member comprising a tubular housing having end members fixed to said tubular housing, one of said end members having an inwardly axially extending portion spaced from said tubular housing, said hinge arms of said collet members extending into the space between the tubular housing and the axially extending portion surrounding the collet members.

* * * * *